United States Patent Office 2,826,037
Patented Mar. 11, 1958

2,826,037

POLYCYCLIC ALDEHYDES AS HYPERGOLIC FUELS

Cleveland R. Scott and James V. Smith, Bartlesville, Okla., assignors to Phillips Petroleum Company, a corporation of Delaware No Drawing. Application November 9, 1951
Serial No. 255,735

7 Claims. (Cl. 60—35.4)

This invention relates to rocket propellants. In one of its more specific aspects this invention relates to hypergolic fuels and their application to the propulsion of rockets.

Our invention is concerned with new and novel rocket propellants and their utilization; a rocket or jet propulsion device, being defined herein as a rigid container for matter and energy so arranged that a portion of the matter can absorb energy in kinetic form and subsequently be ejected in a specified direction. The type rocket to which our invention is applied is that type of jet propulsion device designated as a "pure" rocket, i. e., a thrust producer which does not make use of the surrounding atmosphere. A rocket of the type with which our invention is concerned is propelled by introduction of a propellant material into a combustion chamber therein, and burning it under conditions that will cause it to release energy at a high but controllable rate immediately after entry into the combustion chamber. Rocket propellants, as liquids, are advantageously utilized inasmuch as the liquid propellant material can be carried in a light weight, low pressure vessel and pumped into the combustion chamber, the latter though it must withstand high pressure and temperature, being only necessarily large enough to insure combustion. Also, the flow of liquid propellant into the combustion chamber can be regulated at will so that the thrust, continuous or in intermittent bursts of power, can be sustained, the latter type of liquid propellant flow contributing to a longer life of the combustion chamber and thrust nozzle.

Various liquids and liquid combinations have been found useful as rocket propellants. Some propellants consists of a single material, and are termed "monopropellants." Those propellants involving two materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a fuel component such as ethyl alcohol-water, ammonia, hydrazine, or hydrogen; and nitric acid as the oxidizer with aniline or furfuryl alcohol as the hypergolic fuel component.

When employing 90–100 percent or more nitric acid, i. e., "white fuming nitric acid" as the oxidizer in a rocket bipropellant, it is often necessary, dependent on the specific fuel component, to make ignition more prompt by dissolving from 6 to 14 percent by weight of nitrogen dioxide in the white fuming nitric acid forming thereby "red fuming" nitric acid. A fuel component of a bipropellant material of the type described herein, is spontaneously ignited upon contacting the oxidizer, and for that reason is referred to herein as being "hypergolic." A ratio of oxidizer to hypergolic fuel based on stoichiometric amounts can be utilized within the limits of 0.5:1 to 1.5:1 if desired, the efficiency of the combustion being less at ratios below 1:1 and the use of the oxidizer being less economical at ratios above 1:1. However, practical considerations may necessitate the use of higher ranges, even as high as 6:1.

An object of this invention is to provide new rocket propellants. Another object is to provide hypergolic fuels. Another object is to provide a method for producing immediate thrust to a rocket. Other objects will be apparent to those skilled in the art from the accompanying discussion and disclosure.

In accordance with a broad embodiment of our invention we have provided a new fuel comprising rocket bipropellant materials, the fuel component of which comprises a polycyclic aldehyde characterized by the structural formula

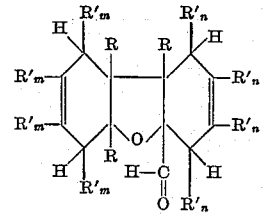

wherein R is selected from the group consisting of a hydrogen atom and a methyl radical, at least one R being hydrogen, wherein R' is selected from the group consisting of a hydrogen atom and an alkyl radical having not more than three carbon atoms, wherein the sum of the carbon atoms in the $R'_m$ and the sum of the carbon atoms in the $R'_n$ in each case is not greater than three and wherein at least two of the $R'_m$ and at least two of the $R'_n$ are hydrogen atoms. These polycyclic aldehydes are also hypergolic when diluted with non-hypergolic fuels, particularly hydrocarbons even in a state of dilution of 50–70 percent by volume and in some cases even as high as 89–90% by volume. Suitable non-hypergolic diluents include the normally liquid hydrocarbons or mixtures thereof such as the relatively low-boiling petroleum fractions, n-heptane, toluene, isooctane, benzene, diisobutylene, gasoline, jet fuels, kerosenes and the like.

Illustrative of the polycyclic aldehydes which are suitable for use in our invention are 2,3,4,5-bis ($\Delta^2$-butenylene) tetrahydrofurfural; 3-methyl-2,3,4,5-bis ($\Delta^2$-butenylene) tetrahydrofurfural; 4-methyl-2,3,4,5-bis (3-methyl-$\Delta^2$-butenylene) tetrahydrofurfural; 3,5-dimethyl-2,3,4,5-bis (2,3-dimethyl-$\Delta^2$-butenylene) tetrahydrofurfural; 2,3(2-isopropyl - $\Delta^2$ - butenylene) - 4,5 - (4 - methyl - $\Delta^2$ - butenylene) tetrahydrofurfural; 5-methyl-2,3-(2-methyl-$\Delta^2$-butenylene) - 4,5 - (2 - ethyl - $\Delta^2$ - butenylene) tetrahydrofurfural; as well as their higher and lower molecular weight homologues. A particularly preferred polycyclic aldehyde is 2,3,4,5-bis ($\Delta^2$-butenylene)tetrahydrofurfural which has the structural formula

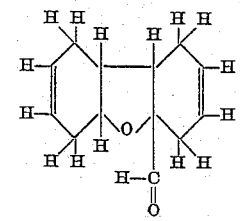

The polycyclic aldehydes of our invention are prepared by the interaction of a conjugated diolefin such as 1,3-butadiene with a cyclic aldehyde such as furfural. The preparation of the polycyclic aldehydes used in the fuel of our invention is set forth in a co-pending patent application of J. C. Hillyer and D. A. Nicewander filed March 14, 1949, Serial Number 81,413, now Patent No. 2,683,151, issued July 6, 1954, the disclosures of which are incorporated in and made a part of this patent application.

Suitable oxidizers in addition to white or red fuming nitric acids can be used in the bipropellant fuel compositions of our invention, particularly to the oxidants such as hydrogen peroxide, ozone, nitrogen, tetraoxide, oxygen and mixed acids, particularly anhydrous mixtures of nitric and sulfuric acids such as 80–90% by volume white or red fuming nitric acid and 10–20% by volume anhydrous or fuming nitric acid. It is within the scope of this invention to employ, preferably dissolved in the oxidizer, ignition or oxidation catalysts. These oxidation catalysts include certain metal salts such as the chlorides and naphthenates of iron, zinc, cobalt and similar heavy metals.

The operation and advantages of this invention are illustrated in the following example. The reactants and their proportions and their specific ingredients are preferred as being typical and are not to be construed to limit the invention.

EXAMPLE I

The materials described below were tested for spontaneous ignition employing fuming nitric acids as the oxidizers. In each test one part by volume of a polycyclic aldehyde was dropped into a vessel containing 2.3 parts by volume fuming nitric acids. Normal heptane was employed as a diluent for the polycyclic aldehydes to determine the maximum amount of dilution which could be tolerated and at the same time retain the property of hypergolicity. Tests were conducted at room temperature, about 70° F. The results are set forth in Table No. 1.

Table No. 1

| Compound | Oxidant | Maximum Dilution Percent n-Heptane |
|---|---|---|
| 2,3,4,5-bis($\Delta^2$-butenylene)-tetrahydrofurfural. | Red Fuming Nitric acid. | [1] 70 |
| Do | White Fuming Nitric Acid. | [1] 50 |

[1] The intensity of the blast increased as the dilution approached 50 percent.

As an added feature of this invention the polycyclic aldehydes described hereinabove are also useful for providing fast burning fuels suitable for use in rocket engines and the like where a hypergolic fuel is not necessarily required. For example, the fuel components of this invention dissolved in a liquid hydrocarbon such as a gasoline, a jet fuel, a kerosene, a naphtha or a petroleum fraction having a boiling point usually not greater than 800° F., even if the resulting solution is not hypergolic with an oxidant such as fuming nitric acid, can be used together with an oxidant and a suitable igniter as a rocket propellant. These fast burning fuels are useful if for various reasons a hypergolic fuel is not desired or required. The polycyclic aldehydes of this invention may be added to a hydrocarbon liquid, above described in a minor amount usually from about 1 to 20 percent by volume of the total mixture to produce fast burning fuels. Suitable fuels are 1–20% by volume 2,3,4,5-bis ($\Delta^2$-butenylene) tetrahydrofurfural or 3-methyl-2,3,4,5-bis ($\Delta^2$-butenylene) tetrahydrofurfural or 4-methyl-2,3,4,5-bis (3-methyl-$\Delta^2$-butenylene) tetrahydrofurfural or 3,5-dimethyl-2,3,4,5-bis (2,3-dimethyl-$\Delta^2$-butenylene) tetrahydrofurfural or 2,3-(2-isopropyl-$\Delta^2$-butenylene)-4,5-(4-methyl-$\Delta^2$-butenylene) tetrahydrofurfural or 5-methyl-2,3-(2-methyl-$\Delta^2$-butenylene)-4,5-(2-ethyl-$\Delta^2$-butenylene) tetrahydrofurfural or mixtures thereof and 80–99% by volume of a petroleum fraction in the gasoline boiling range.

As will be evident to those skilled in the art, various modifications can be made or followed in the light of the foregoing disclosure and discussion without departing from the spirit or scope of this invention.

We claim:

1. In the method for developing thrust by the combustion of bipropellant components in a combustion chamber of a reaction motor the steps comprising separately and simultaneously injecting a stream of an oxidant component and a fuel component into contact with each other in the combustion chamber of said motor, in such proportions as to produce spontaneous ignition, said fuel component comprising an aldehyde characterized by the structural formula

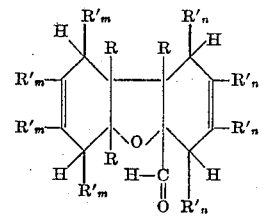

wherein R is selected from the group consisting of a hydrogen atom and a methyl radical, at least one R being a hydrogen atom, wherein R' is selected from the group consisting of a hydrogen atom and an alkyl radical having not more than three carbon atoms, wherein the sum of the carbon atoms in the R'$_m$ and the sum of the carbon atoms in the R'$_n$ in each case is not greater than three and wherein at least two of the R'$_m$ and at least two of the R'$_n$ are hydrogen atoms.

2. The method of claim 1 wherein said fuel component is 2,3,4,5-bis ($\Delta^2$-butenylene) tetrahydrofurfural.

3. The method of claim 1 wherein said fuel component is dissolved in a non-hypergolic liquid hydrocarbon.

4. The method of claim 1 wherein said fuel component is 3-methyl-2,3,4,5-bis ($\Delta^2$-butenylene) tetrahydrofurfural.

5. The method of claim 1 wherein said fuel component is 4-methyl-2,3,4,5-bis (3-methyl-$\Delta^2$-butenylene) tetrahydrofurfural.

6. The method of claim 1 wherein said fuel component is 3,5-dimethyl-2,3,4,5-bis (2,3-dimethyl-$\Delta^2$-butenylene) tetrahydrofurfural.

7. The method of claim 1 wherein said fuel component is 2,3 - (2 - isopropyl - $\Delta^2$ - butenylene) - 4,5 - (4 - methyl-$\Delta^2$-butenylene) tetrahydrofurfural.

References Cited in the file of this patent

UNITED STATES PATENTS

| | | |
|---|---|---|
| 2,028,308 | Wilke | Jan. 21, 1936 |
| 2,474,183 | King | June 21, 1949 |
| 2,485,070 | Schulze | Oct. 18, 1949 |
| 2,494,325 | Anne | Jan. 10, 1950 |
| 2,572,577 | Tissol et al. | Oct. 23, 1951 |
| 2,599,338 | Lifson | June 3, 1952 |
| 2,610,116 | Goodhue et al. | Sept. 9, 1952 |
| 2,683,151 | Hillyer et al. | July 6, 1954 |
| 2,687,419 | Hillyer | Aug. 24, 1954 |

FOREIGN PATENTS

| | | |
|---|---|---|
| 461,671 | Great Britain | Feb. 17, 1937 |

OTHER REFERENCES

"Rockets," May–August 1946, page 7.

UNITED STATES PATENT OFFICE

CERTIFICATE OF CORRECTION

Patent No. 2,826,037　　　　　　　　　　　　　　　　　　March 11, 1958

Cleveland R. Scott et al.

It is hereby certified that error appears in the printed specification of the above numbered patent requiring correction and that the said Letters Patent should read as corrected below.

Column 2, line 36, for "89-90%" read -- 80-90% --; column 3, line 3, for "to the" read -- those --; line 4, after "nitrogen" strike out the comma.

Signed and sealed this 31st day of March 1959.

(SEAL)
Attest:
KARL H. AXLINE
Attesting Officer

ROBERT C. WATSON
Commissioner of Patents